UNITED STATES PATENT OFFICE.

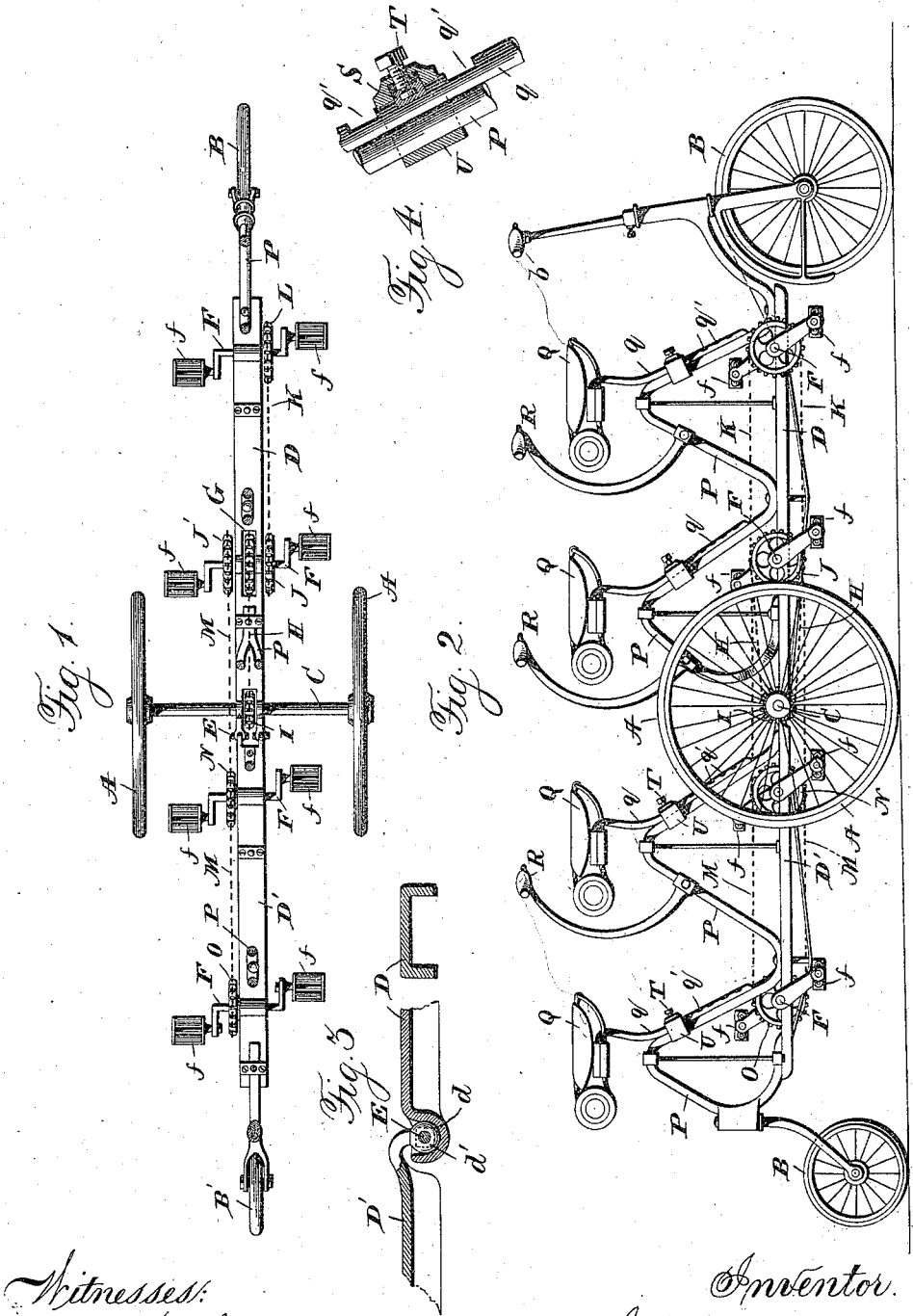

HENRY N. STAATS, OF CLEVELAND, OHIO.

QUADRICYCLE.

SPECIFICATION forming part of Letters Patent No. 558,856, dated April 21, 1896.

Application filed May 5, 1894. Serial No. 510,191. (No model.)

*To all whom it may concern:*

Be it known that I, HENRY N. STAATS, of Cleveland, in the county of Cuyahoga, and in the State of Ohio, have invented certain new and useful Improvements in Quadricycles; and I do hereby declare that the following is a full, clear, and exact description thereof, reference being had to the accompanying drawings, in which—

Figure 1 is a plan view of my quadricycle with the saddles and handle-bars removed; Fig. 2, a side elevation of the complete machine; Fig. 3, a detail view, in longitudinal section, of the frame-coupling; Fig. 4, a detail view of the seat-support clamping and holding device.

Letters of like name and kind refer to like parts in all of the figures.

The design of my invention is to provide a strong and compact quadricycle adapted to carry a number of persons—preferably four or more—at the same time and enabling each to participate in its propulsion; and to this end said invention consists in the mechanism constructed substantially as and for the purpose hereinafter specified.

In the carrying of my invention into practice I employ two driving and supporting wheels A and A, that are mounted upon the opposite ends of a transverse shaft or axle C, that is placed at or near the longitudinal center of the machine, and two other wheels B and B', that are located, respectively, at the front and rear ends thereof, and being, preferably, of less diameter than the wheels A and A. The front wheel B is the steering-wheel and is provided with a suitable handle b, while the rear wheel is a swiveled trailer or caster-wheel.

The main frame of my quadricycle consists of two straight horizontally-arranged bars D and D', that are placed longitudinally in line with each other, with the former in advance of the latter. The axle C is journaled near the rear end of the front bar D and just in rear of said axle. The two bars are pivoted together to enable the machine to yield to irregularities in the road over which it may be traveling and thus avoid undue shocks or jars. The pivotal connection between the two bars D and D' is made as follows: At the rear end of the front bar D are two arms, in the upper side of each of which is provided a cup or socket d, and at the front end of the rear bar D' are two forwardly and downwardly curved arms, each of which at its end has a spherical enlargement or ball d', that is seated in one of the sockets d. A horizontal pin or bolt E, passing through the center of each socket and its ball, is employed to prevent their accidental separation; but it will be apparent that under usual conditions the real connection between the bars is the ball-and-socket device, and that all strain is sustained by the latter.

Journaled upon each bar D and D' are two crank-shafts F and F, each of which is provided with pedals $f$ and $f$ of usual construction. At the longitudinal center of the crank-shaft that is just in advance of the axle C is a sprocket-wheel G, which is connected by a chain H with a like wheel I upon said axle, and also upon said shaft F, at each side of the wheel G, is a sprocket-wheel. One of the latter, J, is connected by a chain K with a sprocket-wheel L upon the front shaft F of the bar D, while from the other wheel, J', a chain M passes over and engages the upper and lower sides of a wheel N upon the front shaft F on the rear bar D' and thence to and around a sprocket-wheel O upon the rear shaft F.

The wheels N and O being in line with the wheel J', a single chain can be used to connect all three, and, should it be preferred, the wheel J could be discarded and the wheel L shifted, so that one continuous chain might be used, running from the latter to the wheel O and engaging the intermediate wheels upon their upper and lower sides. The construction shown is, however, preferred, as it may sometimes be desirable to disconnect the rear bar from the front to reduce the size of the machine, in which event it is merely necessary to remove the chain M and replace it with a short one corresponding with the chain K.

Attached to the upper side of each bar D and D' is an M-shaped frame P, to which are secured two saddles or seats Q and Q and fixed handle-bars R and R. To enable the seats to be adjusted vertically, each is mounted upon a rod q, that is provided with a number of abrupt-sided notches $q'$ and $q'$, into and out of any one of which a clamping and holding block S is movable by means of a screw T, that has its inner end swiveled to said block and passes through a threaded opening in a collar U, which is secured to the one of the frame-bars against which said rod $q$ rests. The block S not only holds the seat or saddle in position vertically, but also prevents turning or twisting thereof. The handle-bars R are also capable of vertical adjustment.

My quadricycle is strong and compact, and the employment of the straight horizontal frame composed of the bars D and D' enables the multiplication of the number of persons to be carried to be effected simply by increasing the length thereof and adding necessary seats, crank-shafts, &c. To reduce its size and carrying capacity, it is required to merely disconnect the rear bar D' and remove the chain M, whereupon a complete two-seated tricycle will be obtained.

For the sake of lightness the bars D and D' are made of grooved or channeled material, as shown.

Having thus described my invention, what I claim is—

1. In combination with driving and supporting wheels, a frame composed of two bars arranged in line with each other, and pivotally and detachably connected together two crank-shafts upon each bar having each a sprocket-wheel, a single chain connecting the wheels of three of said shafts, a second chain connecting the wheel of the fourth shaft and a second wheel upon the adjacent shaft, and gearing between the latter and the driving-wheels, substantially as and for the purpose specified.

2. In combination with driving and supporting wheels, a frame composed of two straight bars, arranged in line with each other, one of which has a socket in its upper side, and the other an arm arching over and detachably seated in the socket, two crank-shafts upon each bar, having each a sprocket-wheel, a single chain connecting three of said wheels, a second chain connecting the remaining sprocket-wheel and a second wheel upon the adjacent shaft, and gearing between the latter and the driving-wheels, substantially as and for the purpose set forth.

In testimony that I claim the foregoing I have hereunto set my hand this 25th day of April, 1894.

HENRY N. STAATS.

Witnesses:
ALFRED L. FRITZSCHE,
WALTER L. COOKE.